US010756807B2

(12) United States Patent
Bagnall et al.

(10) Patent No.: US 10,756,807 B2
(45) Date of Patent: Aug. 25, 2020

(54) SYSTEM AND METHOD FOR TRANSMITTING AND RECEIVING RADAR DATA USING THE AUTOMATIC IDENTIFICATION SYSTEM

(71) Applicant: The United States of America as represented by the Secretary of the Navy, San Diego, CA (US)

(72) Inventors: Bryan D. Bagnall, San Diego, CA (US); Vladimir Matveyev, San Diego, CA (US); Sparta Cheung, San Diego, CA (US); John C. Stastny, San Diego, CA (US)

(73) Assignee: United States of America as represented by the Secretary of the Navy, Washington, DC (US)

(*) Notice: Subject to any disclaimer, the term of this patent is extended or adjusted under 35 U.S.C. 154(b) by 334 days.

(21) Appl. No.: 15/895,750

(22) Filed: Feb. 13, 2018

(65) Prior Publication Data
US 2019/0253130 A1 Aug. 15, 2019

Related U.S. Application Data

(60) Provisional application No. 62/586,331, filed on Nov. 15, 2017.

(51) Int. Cl.
H04B 7/185 (2006.01)
G01S 13/72 (2006.01)
(Continued)

(52) U.S. Cl.
CPC ......... H04B 7/18513 (2013.01); B63B 51/00 (2013.01); G01S 7/003 (2013.01);
(Continued)

(58) Field of Classification Search
CPC ......... B63B 49/00; B63B 43/18; B63B 51/00; B63B 22/16; B63B 2213/02;
(Continued)

(56) References Cited

U.S. PATENT DOCUMENTS 7,817,079 B1 * 10/2010 Funk ................. G08G 3/00
342/41
8,368,585 B2 * 2/2013 Kondo ................. B63B 49/00
342/41
(Continued)

FOREIGN PATENT DOCUMENTS

WO WO2013059916 5/2013

OTHER PUBLICATIONS

Brian L. Karlsen et al., Fusion of Radar and Secondary Sensor Data Using Kinematic Models of Multiple Simultaneous Targets, Sensor Signal Processing for Defence (SSPD) 2015, Sep. 9-10, 2015, Edinburgh, United Kingdom (IEEE Xplore).
(Continued)

Primary Examiner — Olumide Ajibade Akonai
(74) Attorney, Agent, or Firm — Naval Information Warfare Center, Pacific; Kyle Eppele; Young Fei

(57) ABSTRACT

A system comprising a radar subsystem including a radar transmitter and a radar receiver, and an encoder subsystem including a computer connected to a transmitter and two antennas. The computer is configured to encode and transmit a custom payload AIS Type 8 message. A second computer connected to a receiver and antenna receives the message. The custom payload AIS Type 8 message contains target longitude, latitude fields, range, and bearing fields.

A method for transmitting and receiving the radar track of a target ship including: receiving the radar signal at the own ship; encoding the target ship longitude, latitude, speed, and course into a custom payload AIS Type 8 message; trans-
(Continued)

mitting the custom message to a receiver ship; decoding and displaying the target ship longitude, latitude, course, and speed at the receiver ship.

1 Claim, 2 Drawing Sheets

(51) Int. Cl.
    *B63B 51/00*     (2006.01)
    *G08G 3/02*     (2006.01)
    *G01S 7/00*     (2006.01)
    *G01S 13/937*     (2020.01)
    *G01S 13/86*     (2006.01)

(52) U.S. Cl.
    CPC ............ *G01S 13/72* (2013.01); *G01S 13/937* (2020.01); *G08G 3/02* (2013.01); *G01S 13/86* (2013.01)

(58) Field of Classification Search
    CPC .......... G01S 13/937; G01S 7/22; G01S 13/86; G01S 7/12; G01S 7/003; G01S 13/726; G01S 13/72; G01S 13/9307; G01S 13/93; G01S 13/862; G01S 19/45; G01S 19/42; G01S 13/003; G01C 13/00; G01C 21/203; G01C 21/20
    See application file for complete search history.

(56) References Cited

U.S. PATENT DOCUMENTS

| | | | | |
|---|---|---|---|---|
| 9,484,956 | B2* | 11/2016 | Prevost | H03M 13/3994 |
| 9,581,695 | B2* | 2/2017 | Corbett | G01S 15/89 |
| 9,786,183 | B2* | 10/2017 | Short | G01S 5/0027 |
| 10,526,059 | B2* | 1/2020 | Morita | G01S 7/24 |
| 2003/0028294 | A1* | 2/2003 | Yanagi | G01S 13/937 |
| | | | | 701/21 |
| 2013/0271309 | A1* | 10/2013 | Kaida | G01S 7/12 |
| | | | | 342/41 |
| 2014/0127990 | A1* | 5/2014 | Dembovskis | H04W 12/12 |
| | | | | 455/39 |
| 2014/0128098 | A1* | 5/2014 | Behrens | H04B 7/18513 |
| | | | | 455/456.1 |
| 2016/0069987 | A1* | 3/2016 | Ise | G01S 7/12 |
| | | | | 342/179 |
| 2017/0001699 | A1* | 1/2017 | Macikunas | G01S 5/0027 |

OTHER PUBLICATIONS

Andrezj Stateczny et al., Radar and AIS Data Fusion for the Needs of the Maritime Navigation, 2016 International Radar Symposium, May 24-26, 2006, Krakow, Poland (accessed through IEEE Xplore).

* cited by examiner

SYSTEM AND METHOD FOR TRANSMITTING AND RECEIVING RADAR DATA USING THE AUTOMATIC IDENTIFICATION SYSTEM

CROSS-REFERENCE TO RELATED APPLICATION

This application claims the benefit of U.S. Provisional Patent Application Ser. No. 62/586,331 filed Nov. 15, 2017.

FEDERALLY FUNDED RESEARCH AND DEVELOPMENT

The System and Method for Transmitting and Receiving Radar Data Using the Automatic Identification System is assigned to the United States Government and is available for licensing and commercial purposes. Licensing and technical inquiries may be directed to the Office of Research and Technical Applications, Space and Naval Warfare Systems Center Pacific (Code 72120), San Diego, Calif., 92152 via telephone at (619) 553-2778 or email at ssc_pac_t2@navy.mil. Reference Navy Case 103715.

BACKGROUND OF THE INVENTION

This is a system and method that broadcasts the radar contacts, visible on a ship-based radar system, over Automatic Identification System (AIS) channels. This system and method allows non-emitting targets to be located and tracked using the AIS system when the targets are near a radar system equipped with this invention. This allows a radar operator to easily share radar contacts with the worldwide community in an inexpensive manner.

Non-emitting targets are hard to track in the ocean because they do not emit radio signals which can be used to detect, locate, and track them. Non-emitting targets close to shore can be tracked using shore-based radar. Non-emitting targets far from shore are challenging to detect because they are out of range of shore-based radar systems. This invention allows radar targets, including targets far from shore, to be rebroadcast to surrounding AIS receivers. These AIS receivers can then receive the information about non-emitting targets at a further range than they could detect with a radar system.

The present invention offers advantages over alternative systems and methods of detecting non-emitting ships. Synthetic aperture radar (SAR) satellites can be used to detect non-emitting ships from space. Some disadvantages of using SAR satellites to detect non-emitting ships include: (1) the expense of satellite imagery; (2) that ship detection algorithms need to be developed; and (3) that the satellites orbit the Earth every few hours and thus don't have the ability to persistently loiter over and monitor a specific area. Another system could be developed that uploads the radar contacts over the Internet using a satellite Internet connection. The disadvantage of such a method however, is the expense of constantly sending data over a satellite Internet connection.

SUMMARY OF THE INVENTION

The present invention is a system comprising a radar subsystem including a radar transmitter and a radar receiver. The invention also comprises an encoder subsystem including a computer connected to a transmitter and two antennas. The computer is configured to encode and transmit a custom payload AIS Type 8 message via the first antenna. The invention further includes a second computer connected to a receiver and antenna. The second computer is configured to receive the custom payload AIS Type 8 message via the attached antenna and receiver. The custom payload AIS Type 8 message contains longitude and latitude fields, as well as speed and course fields for the target.

The invention may be configured such that the radar and encoder subsystems are on the own ship, and the decoder subsystem is on the receiver ship. The computer of the encoder subsystem may be configured to record the target ship range, bearing, speed, and course from the radar receiver subsystem. This computer may also be configured to decode a GPS signal received from the attached antenna and record the own ship longitude and latitude. This computer may also calculate target ship longitude and latitude, and encode the target ship longitude, latitude, speed, and course into a custom payload AIS Type 8 message. Additionally, this computer may also be configured to transmit the custom payload AIS Type 8 message via the attached transmitter and antenna to the receiver ship, and the second computer on the receiver ship may be configured to receive the message via the attached antenna and receiver. The second computer may further be configured to decode the custom payload AIS Type 8 message for target ship longitude, latitude, speed, and course. This second computer may then be configured to display the target ship longitude, latitude, course, and speed.

A method for transmitting and receiving the radar track of a target ship includes the steps of: illuminating a target ship with a radar signal; receiving the radar signal at the own ship; recording the target ship range, target ship bearing, target ship speed, and target ship course from the radar signal; recording the own ship longitude and latitude; calculating the target ship longitude and latitude; encoding the target ship longitude, latitude, speed, and course into a custom payload AIS Type 8 message at the own ship; transmitting the custom payload AIS Type 8 message to a receiver ship; decoding the target ship longitude, latitude, speed, and course from the custom payload AIS Type 8 message at the receiver ship; and displaying the target ship longitude, latitude, course, and speed at the receiver ship.

BRIEF DESCRIPTION OF THE DRAWINGS

Throughout the several views, like elements are referenced using like elements. The elements in the figures are not drawn to scale, and some dimensions may be exaggerated for clarity.

DETAILED DESCRIPTION OF THE INVENTION

While this invention may be embodied in different forms, the drawings and this section describe in detail specific embodiments of the invention with the understanding that the present disclosure is to be considered merely a preferred embodiment of the invention, and is not intended to limit the invention in any way.

Figure 1:
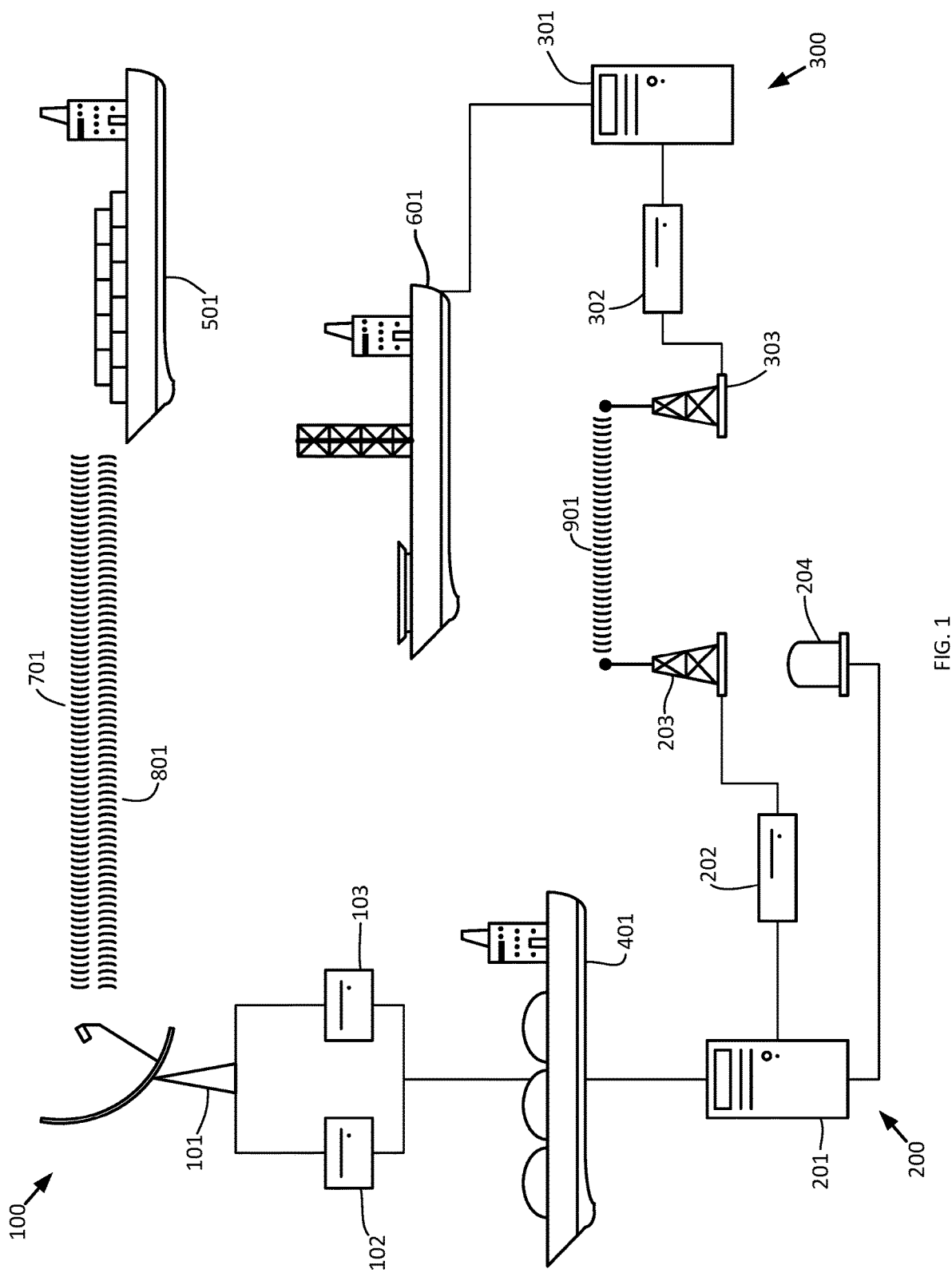
FIG. 1. is a diagram of a system according to one embodiment of the present invention.
Figure 2:
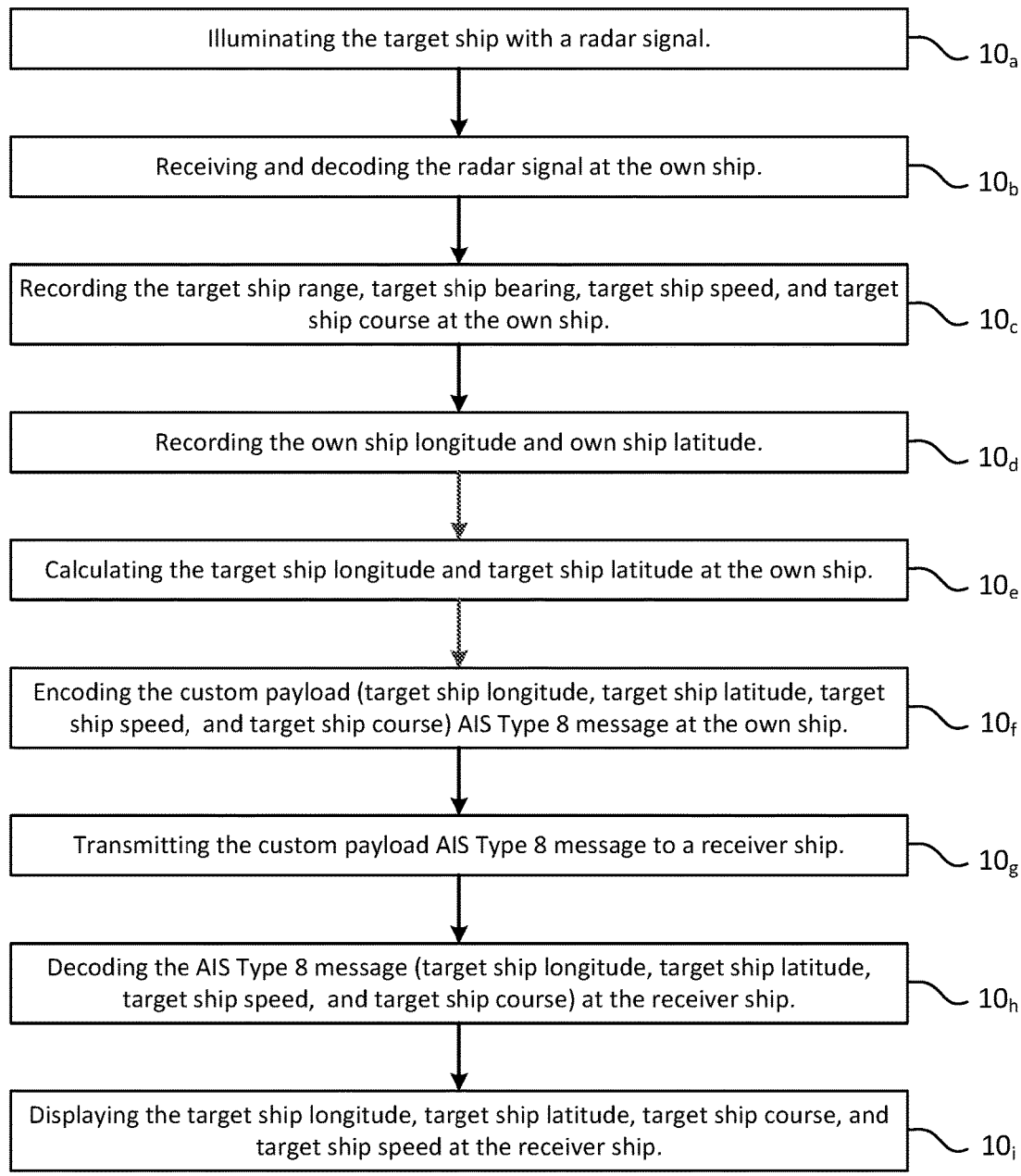
FIG. 2. is a flowchart depicting steps of the method performed according to one embodiment of the present invention.

FIG. 1 depicts an embodiment of the system. FIG. 2 depicts a method 10 where a target ship 501 is tracked using an embodiment of the system. An own ship 401 uses a radar subsystem 100 comprising a radar antenna 101, radar transmitter 102, and a radar receiver 103 to detect objects such as a target ship 501. The radar transmitter 102 transmits a radar signal 701 through the radar antenna 101. Step $10_a$. This radar signal 701 is reflected off of the target ship 501 in the form of a return signal 801, which is received by the radar receiver 103 via the radar antenna 101. Step $10_b$. The return signal 801 is transmitted to and decoded at the first computer 201, which records the target ship range, target ship bearing, target ship speed, and target ship course. Step $10_c$. The first computer 201 additionally receives a GPS signal via the second antenna 204. From this GPS signal, the first computer 201 is able to decode and record the own ship longitude and own ship latitude. Step $10_d$. The first computer 201 then calculates the target ship longitude and target ship latitude at the own ship 401. Step $10_e$. The first computer 201 then encodes the target ship longitude, target ship latitude, target ship speed, and target ship course as an AIS Type 8 message. Step $10_f$. The custom payload AIS Type 8 message 901 is then transmitted via the first transmitter 202 and first antenna 203 to a second computer 301 on a receiver ship 601 via a third antenna 303 and first receiver 302. Step $10_g$. The second computer 301, first receiver 302, and third antenna 303 form part of a decoder subsystem 300 on the receiver ship 601. The second computer decodes the AIS Type 8 message into target ship longitude, target ship latitude, target ship speed, and target ship course at the receiver ship. Step $10_h$. The second computer 301 displays the target ship longitude, target ship latitude, target ship course, and target ship speed at the receiver ship 601. Step $10_i$.

In this embodiment, the first receiver 302 is an AIS receiver. The encoder subsystem 200 encodes the radar signal as a custom payload AIS message. The AIS component of the custom payload AIS Type 8 message 901 is decoded normally by the decoder subsystem 300, while the embedded target ship longitude, target ship latitude, target ship speed, and target ship course are decoded using the present invention. The addition of the embedded target ship information improves situational awareness for the receiver ship 601 over conventional AIS systems. While current AIS systems can only display the location of vessels in a maritime environment if they are equipped with AIS, the present invention is capable of displaying information about vessels which are not equipped with AIS at the receiver ship 601.

The present invention adds a low-cost method of broadcasting non-AIS-emitting vessel (i.e., target ship 501) position, speed, and heading information and reporting the data to other maritime domain participants. The present invention is capable of significantly expanding the common operating picture by adding new non-AIS-equipped vessel target tracks to the AIS picture. The present invention can also extend the common operating picture further away from the shoreline. This system is also built mostly from hardware components already in use, and so little additional hardware or investment is necessary for its implementation. When the present invention works in combination with other sources of vessel reporting information (such as terrestrial and satellite AIS, shore data, or satellite imagery), it increases the confidence level of the acquired data, increasing the number of correlated targets (i.e., targets whose position is confirmed by more than one source) available to the receiver ship 601. Alternatively, the invention's broadcast custom payload AIS Type 8 messages 901 can be received by either terrestrial AIS receivers or satellite AIS receivers. The custom payload AIS Type 8 messages 901 can also be encrypted for added security.

The present invention uses existing AIS channels to communicate radar target position for a target ship 501 collected by a radar subsystem 100 aboard an own ship 401. The present invention consists of a radar subsystem 100 consisting of a radar antenna 101, a radar transmitter 102, and a radar receiver 103, as well as two additional subsystems: (1) an encoder subsystem 200; and (2) a decoder subsystem 300. The encoder subsystem 200 works by collecting radar target messages (TTMs) from an own ship's 401 radar subsystem 100, extracting relevant target position information from these messages, and sending that information as a custom payload via a custom payload AIS Type 8 message 901. The first transmitter 202 can be an Aids-to-Navigation (AtoN) transmitter that is used to send these custom payload AIS Type 8 messages 901 over VHF link. The encoder subsystem 200 comprises the following components: (1) a first computer 201 with custom encoding software; (2) a first transmitter 202 in the form of an AtoN transmitter; (3) a first antenna 203 in the form of a VHF antenna; and (4) a second antenna 204 in the form of a GPS antenna. The decoder subsystem 300 works by screening through AIS messages received by a first receiver 302 in the form of an AIS receiver, selecting custom payload AIS Type 8 messages 901 sent by the encoder subsystem, and decoding the custom payload AIS Type 8 message 901 payload to receive positional data for the target ship 501. The decoder subsystem comprises: (1) a second computer with custom decoding software; (2) an first receiver 302 in the form of an AIS receiver; and (3) a third antenna 303 in the form of a VHF antenna.

The present invention provides significant improvements to regional maritime domain awareness by adding new vessels to the common operating picture. It is a very low cost technology, relying on hardware already in use (e.g., shipboard radars and AIS receivers). Targets reported by the onboard ship radar are an essential part of the real-time operating picture available to a ship's crew. This invention makes it possible to share this common operating picture with other maritime domain participants (e.g., maritime operation centers, various maritime agencies and authorities, as well as other vessels). Thanks to the frequent update rate of the radar/AIS operation, this received data is near real-time and can be used to meet a wide range of operational needs.

A core idea of this invention is the ability to make radar contacts (targets) reported by a radar equipped ship visible to other maritime domain participants and users of software such as the U.S. Department of Transportation SeaVision software. In this invention, radar contacts are reported by a radar receiver 103 in the format of the National Marine Electronics Association (NMEA) 0183 Target Tracked Message (TTM) standard. A first computer 201 can be set up to receive these TTM messages via serial port or USB connection with the radar receiver 103. Original TTM output can be collected by connecting two wires to the automatic radar plotting aid (ARPA) pins A and B inside the radar receiver 103. Either the RS-232 or RS-422 serial port interfaces may be use to then make this signal readable by a first computer 201. Recommended baud rates are configured according to the individual radar subsystem's 100 user manuals. Typically, for a TTM output reading, a baud rate of 4800 or 9600 baud may be used.

Fields of particular importance to this invention within a TTM message are the target ship 501 position parameters: target ship range, target ship bearing, target ship speed, and target ship course. Target identification and status are also typically necessary for proper identification. In order to pass target information received from the radar subsystem 100 to other maritime domain participants, this application makes use of the VHF link for its cost-effectiveness, speed, and relative simplicity. Because TTMs report the target ship's 501 position data using range and bearing relative to the source radar subsystem 100, it is necessary to know the position of the radar subsystem 100 equipped own ship 401 when the radar target is encountered. One way to obtain the own ship's 401 position is from the GPS-type message issued by the own ship 401 radar subsystem 100. An example of such a message is the NMEA 0183 RMC message format. The radar receiver 103 will issue such RMC messages in its normal mode of operation, and these messages can be read via the same connection/interface as the TTM messages. RMC messages contain the own ship longitude and own ship latitude. These fields can be extracted via processing software by the first computer 201 to determine the own ship's 401 position.

The information obtained by the encoder subsystem 200 can be sent over the VHF link. The NMEA 0183 protocol allows for custom payloads for AIS Message Type 8. A special type of AIS radio transponder—the first transmitter 202—known as the Aids to Navigation (AtoN) transmitter can be used to broadcast such a message. For robustness and reliability purposes, it is advisable to keep the custom payload fields as short as possible. In this particular application, the payload is limited to six fields: the target ship longitude, target ship latitude, target ship speed, target ship course, target identification, and target status. Target ship range and target ship bearing is converted to a more traditional and user-friendly format (target ship longitude and target ship latitude) by means and software and what is known as the "haversine" formula, equations 1-3 (below):

$$a = \sin^2\left(\frac{\varphi_2 - \varphi_1}{2}\right) + \cos(\varphi_1) \cdot \cos(\varphi_2) \cdot \sin^2\left(\frac{\lambda_2 - \lambda_1}{2}\right); \quad (1)$$

$$c = 2 \cdot \arctan2(\sqrt{a}, \sqrt{1-a}); \text{ and} \quad (2)$$

$$d = R \cdot c \quad (3)$$

where $\varphi$ is latitude ($\varphi_1$ and $\varphi_2$ correspond to the first and second points), $\lambda$ is longitude ($\lambda_1$ and $\lambda_2$ correspond to the first and second points), R is the Earth's mean radius. The "haversine" formula yields distance d, which is the great-circle distance between two points (the shortest distance over the Earth's surface). From this formula, a yields the square of half the chord length between the two points, and c yields the angular distance in radians. Where the arctan2 function is not available, c may be calculated, equation 4 (below):

$$c = 2 \cdot \arcsin(\min[1, \sqrt{a}]) \quad (4)$$

where min is the minimum function.

The first transmitter 202 (AtoN transmitter) can be enabled to broadcast a custom payload AIS Type 8 message 901. The AtoN is a radio transponder. It can therefore be enabled to broadcast the custom payload AIS Type 8 message 901 when it receives a broadcast binary message (BBM) via serial port. If the first transmitter 202 is an AtoN type, it needs to be connected to a GPS-type antenna for a few minutes before the start of any transmission to ensure proper operation. The baud rate for the connection between the first computer 201 and the first transmitter 202 should be set according to the manufacturer's recommendations.

The AIS Type 8 message allows for a custom payload. Any data to be sent over VHF using this message type will be converted to binary using the 6-bit ASCII table. Custom bit mapping is allowed. There are, however, some additional requirements to the message format. AIS Message Type 8 is an application specific message, and therefore has to have an application identifier, which takes up the first 16 bits of the payload. The first 10 bits of the application identifier is the designated area code, and the remaining six bits is the function identifier. For testing purposes, the designated area code should be set to zero. Function identifier values can take on values from zero to 63. During the testing and development phase, all zeros were used for both the designated area code and function identifier. To simplify the encoding/decoding procedure, bit 17 and bit 18 were set to zero. This had the additional benefit of keeping everything aligned for 6-bit ASCII encoding (e.g., as 18 bits is a multiple of six, the first three characters of the payload are zero characters). Bit 17 and bit 18 of the payload data could also be reserved for future use to convey some other information.

Upon receiving a BBM command, the first transmitter 202 will issue an AIVDO message (i.e., the system is reporting that it is sending an AIS Type 8 message) and broadcast this message over the VHF channels through the first antenna 203. The default frequency for AIS Channel A is 161.975 MHz. The default frequency for AIS Channel B is 162.025 MHz.

Since the first transmitter 202 is issuing a broadcast message in the form of a custom payload AIS Type 8 message 901, it will be received by all AIS receivers within reception range. A first receiver 302 in the form of an AIS receiver will see the custom payload AIS Type 8 message 901 in the form of an AIVDM message. Since this message has a binary payload composed by using 6-bit ASCII and custom bit mapping, it will not be readable or meaningful in its raw form. Thus, corresponding decoding software must be used to extract the useful fields of this payload.

There are many different AIS Type 8 messages that can be sent over radio link in busy marine traffic areas. Accordingly, an ability to identify the unique custom payload AIS Type 8 message 901 specific to the present invention is essential for the decoder subsystem 300. This can be achieved in several ways. The decoder subsystem 300 can look for a specific Marine Mobile Service Identity (MMSI) from a list of authorized users of this application. Alternatively, where the binary payload of the custom payload AIS Type 8 message 901 has 16 bits dedicated to storing an Application ID, a particular Application ID can be assigned to this application and the decoder subsystem 300 can discriminate messages based on their Application ID. Once the custom payload AIS Type 8 message 901 is decoded, it can be used. In the simplest form, the position data could be displayed as text in human readable format, relying target position to other maritime domain participants and adding to the common operating picture of the region.

An example of a more advanced application of the decoding subsystem 300 is injecting the target ship 501 position data into the Maritime Safety and Security Information System (MSSIS) and subsequently displaying the information in SeaVision. This makes targets visible to all SeaVision users globally. There may be multiple ways to inject the target positional data in to MSSIS. Currently, shore-radar targets are injected into MSSIS by using PVOL messages, a proprietary standard used by the Department of Transportation Vople Center (the creators of SeaVision). After decoding a payload of the custom payload AIS Type 8 message, the decoder subsystem 300 can create a PVOL message using the appropriate fields of the decoded payload such as the target ship longitude, target ship latitude, and target ship speed. The PVOL messages can be composed and formatted by decoding software present on the second computer 301.

We claim:

1. A system comprising:
a radar subsystem comprising a radar antenna connected to a radar transmitter and a radar receiver;
an encoder subsystem connected to the radar subsystem comprising
  a first computer connected to a first transmitter, a first antenna, and a second antenna, wherein the first computer is configured to encode a custom payload AIS Type 8 message and transmit the custom payload AIS Type 8 message via the first antenna;
a decoder subsystem comprising
  a second computer connected to a first receiver and a third antenna,
  wherein the second computer is configured to receive the custom payload AIS Type 8 message via the third antenna and the first receiver; and
  wherein the custom payload AIS Type 8 message comprises a target longitude field, a target latitude field, a target speed field, and a target course field;
wherein the radar subsystem is configured to illuminate a target ship with a radar signal and receive a return radar signal at an own ship;
wherein the first computer is configured to record from the radar receiver subsystem a target ship range, a target ship bearing, a target ship speed, and a target ship course;
wherein the second antenna is configured to receive a GPS signal;
wherein the first computer is configured to decode the GPS signal and record an own ship longitude and own ship latitude;
wherein the first computer is configured to calculate a target ship longitude and a target ship latitude;
wherein the first computer encodes at the own ship the target ship longitude, the target ship latitude, the target ship speed, and the target ship course into the custom payload AIS Type 8 message;
wherein the first computer is configured to transmit via the first transmitter and first antenna the custom payload AIS Type 8 message to a receiver ship;
wherein the second computer is configured to receive via the third antenna and first receiver the custom payload AIS Type 8 message and decode the target ship longitude, target ship latitude, target ship speed, and target ship course;
wherein the second computer is configured to display the target ship longitude, target ship latitude, target ship course, and target ship speed; and
wherein bits 1-16 of the custom payload AIS Type 8 message are set to zero.

* * * * *